Figure 6:
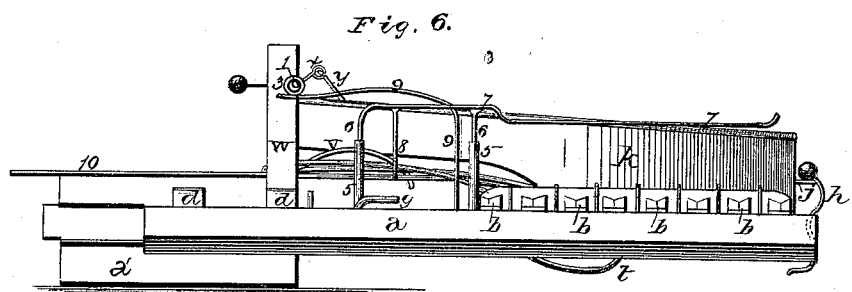

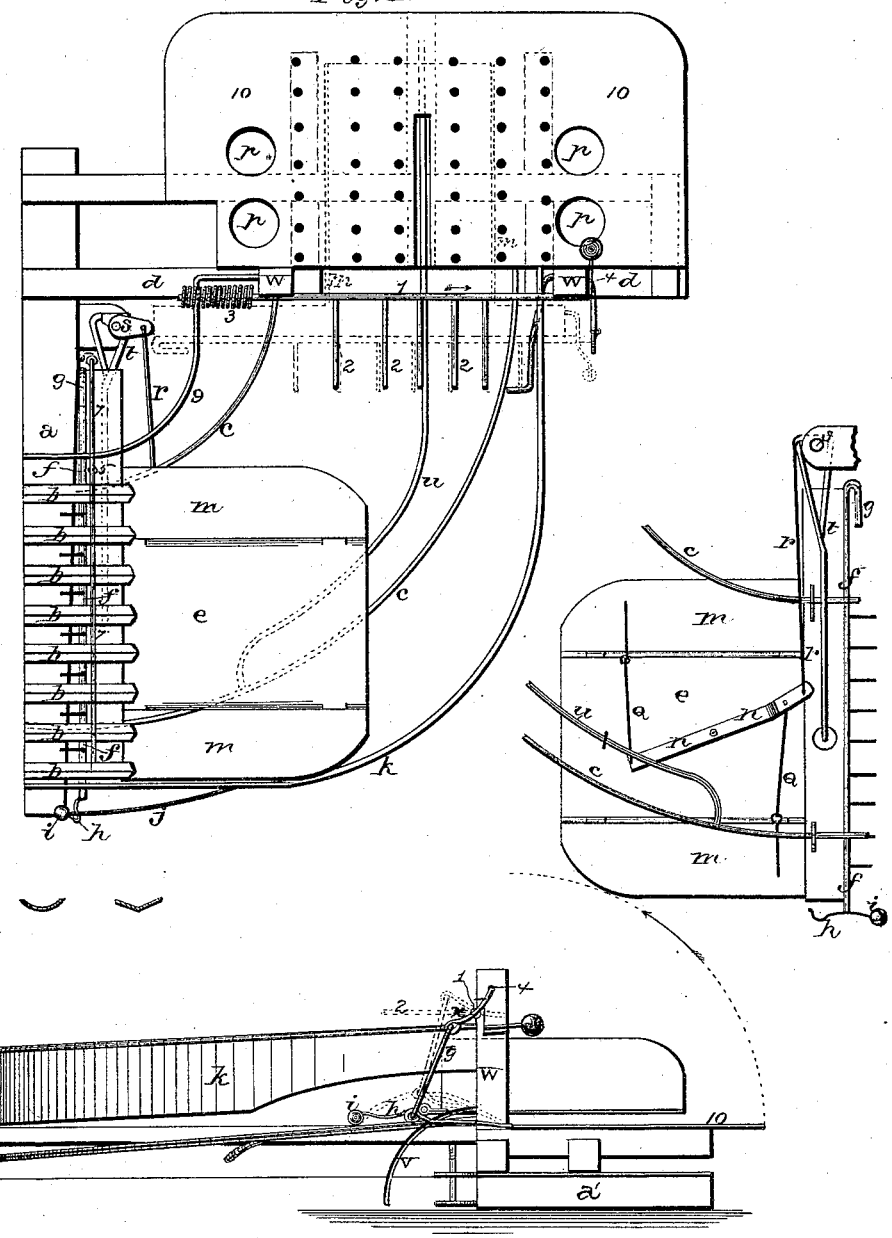

J. E. BUXTON.
Harvester.

No. 168,609.

2 Sheets--Sheet 2.

Patented Oct. 11, 1875.

WITNESSES.

INVENTOR.

UNITED STATES PATENT OFFICE.

JOHN E. BUXTON, OF OWATONNA, MINNESOTA.

IMPROVEMENT IN HARVESTERS.

Specification forming part of Letters Patent No. 168,609, dated October 11, 1875; application filed February 6, 1875.

*To all whom it may concern:*

Be it known that I, JOHN E. BUXTON, of Owatonna, in the county of Steele and State of Minnesota, have invented certain new and useful Improvements in Binders for Reapers; and I do hereby declare the following to be a full, clear, and exact description of the invention, such as will enable others skilled in the art to which it pertains to make and use it, reference being had to the accompanying drawings, which form part of this specification.

My invention relates to an improvement in grain-binders for harvesters; and it consists in the arrangement and combination of devices, which will be more fully described hereafter, whereby the grain is delivered to the binders in a form ready to be bound into bundles.

The accompanying drawings represent my invention.

$a$ represents the cutter-bar, to the top of which are secured a number of concave slats, $b$, upon which the grain falls as it is cut, and which are made concave upon their tops so as to catch any shelled grain that may fall upon them. Extending back from the cutter-bar $a$ are the two curved rods $c$, which have their rear ends secured to the frame or timbers $d$, placed at right angles to the cutter-bar, and upon which the binders' platform is placed. Moving back and forth upon these rods $c$, between the cutter-bar and binders' platform, is the movable platform $e$, to the front edge of which is pivoted the partly-rotating rake $f$, provided with teeth long enough to reach through between the slats $b$, to or near the front edge of the cutter-bar, and, as the rake is partially turned around, these teeth rise upward, and sweep the cut grain onto the platform. Upon the inner end of the rake is formed the hook $g$, while on the outer end is secured a rod, $h$, having upon its forward end a ball or weight, $i$, which catches over the rod $j$ secured to the outside of the curved vertical edge $k$. As the movable platform moves toward the cutter-bar, the hook $g$ on the end of the rake $f$ comes in contact with the rounded edge of the rear of the cutter-bar, and thus causes the rake to turn partly around, raising the teeth upward under the grain, and raising the rod $h$, so that the ball $i$ will catch over the top of the rod $j$. As the platform $e$ moves backward, this rod $j$ holds the rake-teeth raised upward until they have moved back from between the slats, when the rod $h$ comes in contact with the lower edge of the wall $k$ at that point where there is a notch, $l$, formed, and where the wall begins to curve backward. As the rod strikes this point, the rod is forced downward so as to lower the teeth, in order that when the platform again comes forward the teeth will pass down under the cut grain on the slats $b$. The movable platform $e$ has attached to each of its sides a wing, $m$, which, as the platform moves back gradually assume a vertical position, so as to bring the grain scattered over the whole surface of the platform all together, in a convenient form for bundling. Pivoted under the center of the platform $e$ is a lever, $n$, which is connected to each of the wings $m$ by a connecting-rod, $Q$. The forward end of this lever $n$ is attached by a connecting-rod, $r$, to a point a little one side of the center $s$, so that as the platform $e$ moves backward it approaches nearer and nearer to this point, and as the rod $r$ forces the forward end of the lever $n$ outward, this lever, by means of the connecting-rods $Q$, gradually raises the wings into a vertical position, for the purpose described. Pivoted upon the vertical posts at $s$ is the rod $t$, having its other end attached to the under side of the platform, and which is connected to the operating mechanism of the machine by any suitable devices, so as to cause it to move back and forth through any desired portion of a circle. In order to support the rear end of the platform $e$, there is secured a bent rod, $u$, to the outer one of the two curved rods $c$, to which the platform is attached by means of a ring or loop, the rear end of the said rod $u$ being secured to the frame-work that supports the binders' platform. As the platform $e$ moves backward, it strikes a bent lever, V, which is pivoted to the side of one of the two standards W, and which has its shorter end attached to the hooked lever X by the connecting-rod $y$. This lever X is secured at right angles to the horizontal bar 1, which has a number of rods or teeth, 2, secured to it so as to sweep the grain from the movable platform e upon the binders' platform, as the movable platform starts on its forward motion, and which bar 1 has a suitable spring, 3, secured to its inner end for the purpose of holding the bar pressed inward, and throwing it back to place after it has been moved. As the platform e strikes the bent lever V it forces it downward, which downward movement raises the hooked end of the lever X upward, turning the bar 1 around, so that the teeth 2 hang vertically downward, forming a gate across the end of the movable platform e, to prevent it from carrying the grain back with it. As the end of the lever X reaches the hole 4 in the side of the standard to which the bent lever V is pivoted, the spring on the end of the bar 1 moves the bar endwise, drawing the hook into the hole, where it is held. The gate is thus held closed until after the movable platform e has moved forward almost entirely from under the gate, when the inner wing of the platform strikes against one of the teeth 2 and moves the bar outward sufficiently far to release the hooked lever X, when the spring 3 causes the bar 1 to turn around far enough to raise the teeth to a horizontal position again. Upon the top of an extension on the inner front edge of the platform are two vertical tubes, 5, into which drop the two supports 6 from the bar 7, which bar extends across the front edge of the platform, and has a pendent hook, 8, reaching down just over the hook g on the rake-head. Extending upward and backward from the front edge of the cutter-bar is a curved rod, 9, which passes under the bar 7, between the two tubes 5. As the rake f is turned partly around the hook g is raised upward, so as to be held in that position by the hook 8 until the platform has moved backward a short distance, when the curved rod 9 raises the bar 7 upward sufficiently high to disengage the two hooks, when the rake is forced partly around and downward by the passage of the rod h under the curved wall or edge k. The binders' platform 10 has a large number of perforations through it, so that any shelled grain that may fall upon it will pass through into the drawer a' underneath, and thus be saved. This platform is hinged to the two standards W, so that it can be freely opened upward, and has the two holes p upon each side, through which the binders' feet pass as they sit at work.

Having thus described my invention I claim—

1. The combination of the swinging platform and rake f hinged thereon, substantially as described.

2. The combination of the rake f, platform, rod h, ball or catch i, rod j, and wall k, substantially as shown.

3. A movable platform, sliding upon suitable ways, and provided with folding wings, substantially as shown and described.

4. The combination of the platform e, rod t, wings m, lever n, and connecting-rods Q r, substantially as set forth.

5. The combination of the swinging platform, binders' platform, and rake for sweeping the grain from the swinging platform, substantially as described.

6. The combination of the bent lever V, lever X, rod y, bar 1, teeth 2, and spring 3, substantially as shown.

7. The combination of the tubes 5, supports 6, bar 7, hook 8, curved rod 9, and rake f, having the hook g, substantially as shown and described.

In testimony that I claim the foregoing I have hereunto set my hand this 22d day of January, 1875.

JOHN E. BUXTON.

Witnesses:
H. H. JOHNSON,
J. M. BURLINGAME.